(12) United States Patent
Feder et al.

(10) Patent No.: US 11,277,777 B2
(45) Date of Patent: Mar. 15, 2022

(54) ABNORMAL MOBILITY PATTERN DETECTION FOR MISBEHAVING DEVICES

(71) Applicant: Spirent Communications, Inc., San Jose, CA (US)

(72) Inventors: Peretz M. Feder, Englewood, NJ (US); Sandra R. Thuel, Middletown, NJ (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

(21) Appl. No.: 16/898,215

(22) Filed: Jun. 10, 2020

(65) Prior Publication Data
US 2020/0396657 A1 Dec. 17, 2020

Related U.S. Application Data

(60) Provisional application No. 62/862,626, filed on Jun. 17, 2019, provisional application No. 62/860,203, filed on Jun. 11, 2019.

(51) Int. Cl.
*H04W 36/04* (2009.01)
*H04W 36/00* (2009.01)
(Continued)

(52) U.S. Cl.
CPC ....... *H04W 36/0083* (2013.01); *H04W 24/02* (2013.01); *H04W 36/0061* (2013.01);
(Continued)

(58) Field of Classification Search
CPC . H04W 24/02; H04W 48/18; H04W 28/0268; H04W 24/08; H04W 28/24
See application file for complete search history.

(56) References Cited

U.S. PATENT DOCUMENTS 6,097,953 A * 8/2000 Bonta ................... H04W 36/30
455/436
7,263,358 B2 8/2007 Chiou
(Continued)

OTHER PUBLICATIONS

3rd Generation Partnership Project; Technical Specification Group Services and System Aspects; Architecture enhancements for 5G System (5GS) to support network data analytics services (Release 17), (3GPP TS 23.288 V17.0.0 (Mar. 2021)), Mar. 2021,159 pgs.
(Continued)

*Primary Examiner* — Michael T Vu
(74) *Attorney, Agent, or Firm* — Haynes Beffel & Wolfeld LLP; Ernest J. Beffel, Jr.

(57) ABSTRACT

The disclosed technology teaches detecting abnormal behavior of a UE mobile device, including a network data analytics function component, in communication with core network components of a cellular network, subscribing to location change-related events that report a change event for a UE device connection to and/or drop or handover from a cell. Included is analyzing location change-related events to detect abnormal handover behavior when the UE device changes its selection of a base station or cell more than N times in not more than M minutes, and reporting the detected abnormal handover behavior with an identifier of the UE mobile device involved and the involved cell's ID. The technology also applies to a group of UE devices selected for analysis, by device, geography or custom-defined affinity, with selection changes among a set of base stations or neighboring cells, each selected at least twice by the UE device in M minutes.

25 Claims, 4 Drawing Sheets

(51) Int. Cl.
  H04W 36/08 (2009.01)
  H04W 24/02 (2009.01)
  H04W 48/20 (2009.01)
  H04W 36/16 (2009.01)
  H04W 84/04 (2009.01)

(52) U.S. Cl.
  CPC ........... *H04W 36/04* (2013.01); *H04W 36/08* (2013.01); *H04W 36/165* (2013.01); *H04W 48/20* (2013.01); *H04W 84/045* (2013.01)

(56) References Cited

U.S. PATENT DOCUMENTS

2019/0394279 A1* 12/2019 Dao .................... H04W 48/04
2020/0107205 A1* 4/2020 Yang ................... H04W 64/006

OTHER PUBLICATIONS

ETSI Technical Specfication, System Architecture for the 5G System, (3GPP TS 23.501 version 15.2.0 Release 15). Jun. 2018, 219 pages.

3rd Generation Partnership Project; Technical Specification Group Services and System Aspects; Architecture enhancements for 5G System (5GS) to support network data analytics services, (3GPP TS 23.288 V16.0.0, Release 16), Jun. 2019, 52 pages.

ETSI Technical Specfication, 5G; Procedures for the 5G System (3GPP TS 23.502 version 15.3.0 Release 15), Sep. 2018, 329 pages.

3rd Generation Partnership Project; Technical Specification Group Services and System Aspects, Procedures for the 5G System Stage 2, (3GPP TS 23.502 version 16.3.0 Release 16), Dec. 2019, 329 pages.

3rd Generation Partnership Project; Technical Specification Group Services and System Aspects; System architecture for the 5G System (5GS); Stage 2, (3GPP TS 23.501 version 16.3.0 Release 16), Dec. 2019, 417 pages.

3rd Generation Partnership Project; Technical Specification Group Services and System Aspects; Architecture enhancements for 5G System (5GS) to support network data analytics services, (3GPP TS 23.288 V16.2.0, Release 16), Jun. 2019, 57 pages.

3rd Generation Partnership Project; Technical Specification Group Core Network and Terminals; 5G System; Network Data Analytics Services; Stage 3 (3GPP TS 29.520 V16.3.0, Release 16), Mar. 2020, 83 pages.

3rd Generation Partnership Project; Technical Specification 5G; 5G System; Network Data Analytics Services; Stage 3 (3GPP TS 29.520 version 16.5.1 Release 16) Nov. 2020, 103.

5G Trials for Cooperative, Connected and Automated Mobility along European 5G Cross-Border Corridors—Challenges and Opportunities, (5G PPP H2020 ICT-18-2018 Projects) ,v1, Oct. 2020, 48pgs.

Feher, Z., et al., "Ping-pong Reduction using Sub cell Movement Detection," 2012 IEEE 75th Vehicular Technology Conference, IEEE Xplore, Jul. 16, 2012, 5 pages.

* cited by examiner

FIG. 1 5GS Non-Roaming Service-Based Representation of Reference Architecture (Prior Art)

FIG. 2 5GS Non-Roaming Reference Point Representation of Reference Architecture (Prior Art)

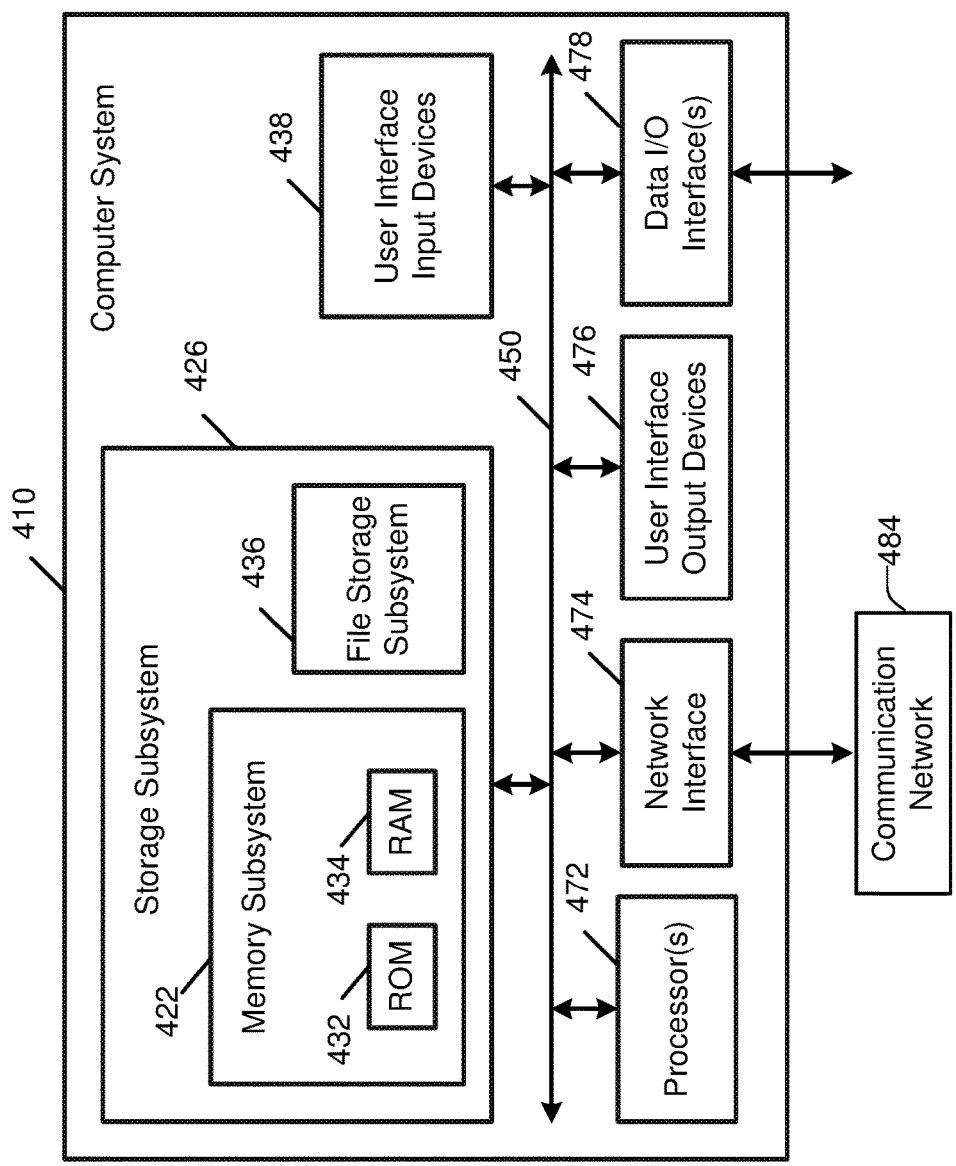
Fig. 4 Computer System

ABNORMAL MOBILITY PATTERN DETECTION FOR MISBEHAVING DEVICES

CROSS-REFERENCE TO OTHER APPLICATIONS

This application claims the benefit of U.S. Provisional Patent Application No. 62/860,203, entitled "ABNORMAL MOBILITY PATTERN DETECTION FOR MISBEHAVING DEVICES," filed on 11 Jun. 2019 and U.S. Provisional Patent Application No. 62/862,626, entitled "ABNORMAL MOBILITY PATTERN DETECTION FOR MISBEHAVING DEVICES," filed on 17 Jun. 2019, which applications are incorporated herein by reference in their entirety.

BACKGROUND

The approaching implementation of 5G will intensify the rate of digital transformation for Communications Service Providers (CSPs). 5G technology will bring more devices, more cell sites and more configurability. Service providers may find it useful to monitor, for abnormal behavior, mobile devices that utilize 5GS equipment and to qualify new 5G equipment against abnormal behavior.

An opportunity arises to provide systems and methods for detecting abnormal behavior of user equipment mobile devices.

SUMMARY

The abnormal behaviors addressed in this application relate to oscillation or other frequent shifting of connection between UE and base stations or cells. A variety of conditions described below can lead to these types of behavior. One implementation of the disclosed technology teaches a method of detecting specific types of abnormal behavior of a user equipment (UE) mobile device. This method includes relying on a network data analytics function (NWDAF) component, in communication with core network components of a cellular network, that subscribes to location change-related events that report at least a change event for a UE mobile device connection to and/or drop or handover from a cell. The disclosed method also includes analyzing the location change-related events to detect abnormal hand over (HO) behavior when the UE mobile device changes its selection of a base station or cell more than N times in not more than M minutes, such as 10 times in not more than 5 minutes and reporting the detected abnormal HO behavior with an identifier of the UE mobile device involved.

Particular aspects of the technology disclosed are described in the claims, specification and drawings.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4 is a simplified block diagram of a computer system that can be used for detecting abnormal behavior of user equipment mobile devices, according to one implementation of the disclosed technology.

DETAILED DESCRIPTION

Figure 1:
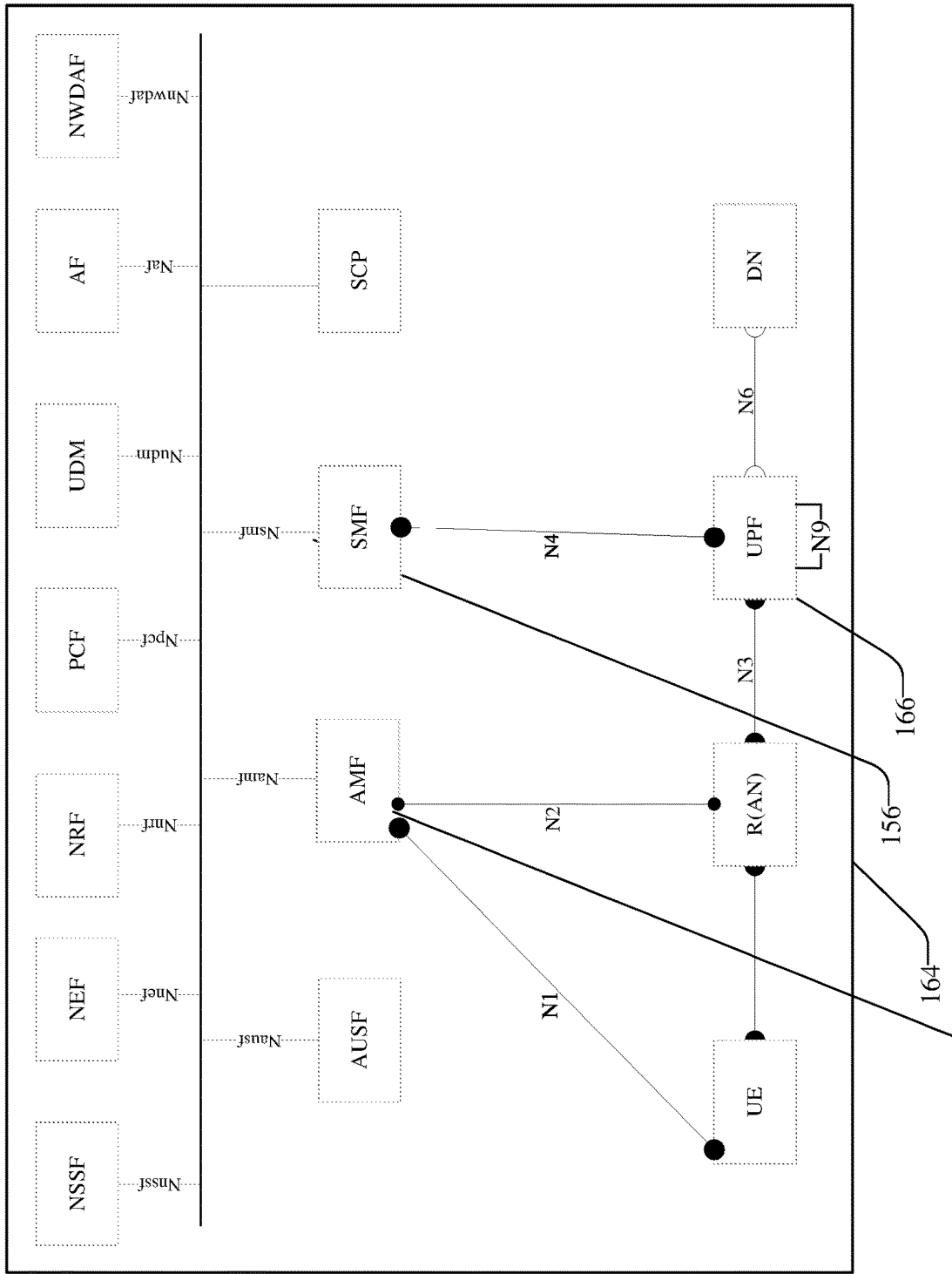
FIG. 1 shows a 5GS non-roaming service-based representation of the reference architecture in which network functions within the control plane enable other authorized network functions to access their services.

The following description of the disclosure will typically be with reference to specific embodiments and methods. It is to be understood that there is no intention to limit the disclosure to the specifically disclosed embodiments and methods, but that the disclosure may be practiced using other features, elements, methods and embodiments. Preferred embodiments are described to illustrate the present disclosure, not to limit its scope. Those of ordinary skill in the art will recognize a variety of equivalent variations on the description that follows. Like elements in various embodiments are commonly referred to with like reference numerals.

This application incorporates by reference U.S. Patent Application No. 62/860,203 "Abnormal Mobility Pattern Detection for Misbehaving Devices" for all purposes, which is an earlier version of this text.

One of the standard setting bodies involved in 5G technology is the 3rd Generation Partnership Project (3GPP), a global initiative for setting mobile broadband standards, which issues Technical Specifications (TS), in collaboration with the European Telecommunications Standards Institute (ETSI). Three TS documents that describe aspects of 5G systems are: (1) ETSI TS 123 501 System Architecture for the 5G System includes the network data analytics function (NWDAF) component in the system architecture, (3GPP TS 23.501 version 16.3.0 Release 16), referred to as 501 in this document; (2) ETSI TS 123 502 Procedures for the 5G System describes standard operating processes for the 5G system, (3GPP TS 23.502 version 16.3.0 Release 16), referred to as 502 in this document; and (3) 3GPP TS 23.288 Architecture enhancements for 5G System (5GS) to support network data analytics services (Release 16, version 16.3.0, 2020 Release 16) describes enhancements for 5GS to support network data analytics services, referred to as 288 in this document. The foregoing three documents are incorporated herein by reference in their entireties for all purposes.

Abnormal behavior of devices will become more critical as 5G services enable provisioning of more and new types of devices. One of the behaviors that results in a negative impact on core network equipment is rapid switching of UE mobile devices, including IoT devices, such as car components, among base stations or neighboring cells. It is expected that causes of such switching will include malicious UE malware, poor network planning of antenna tilts for adjacent cells, bad weather with wind causing unplanned antenna tilts of adjacent cells, and frequent blocking of a cell receiving path for reasons such as unplanned or malicious RF interference or a frequent movement of blocking elements such as tall vehicles.

The technology disclosed works in either a test lab or live network to detect rapid switching with or without reregistration of devices to the network and or to specific registration area. It detects switching of UE mobile devices; both mobile and stationary types. It detects switching between two base stations or neighboring cells (ping-ponging), round-robin switching among at least two base stations or cells, and linear switching among base stations or neighboring cells by a fast moving UE mobile device.

This technology extends the capabilities of a network data analytics function (NWDAF), in communication with core network components of a cellular network, subscribing to change-related events, analyzing the events to detect abnormal handover (HO) behavior when the UE mobile device changes its selection of a base station or a cell more than N times in not more than M minutes, and reporting detected abnormal behavior.

Acronyms

Figure 2:
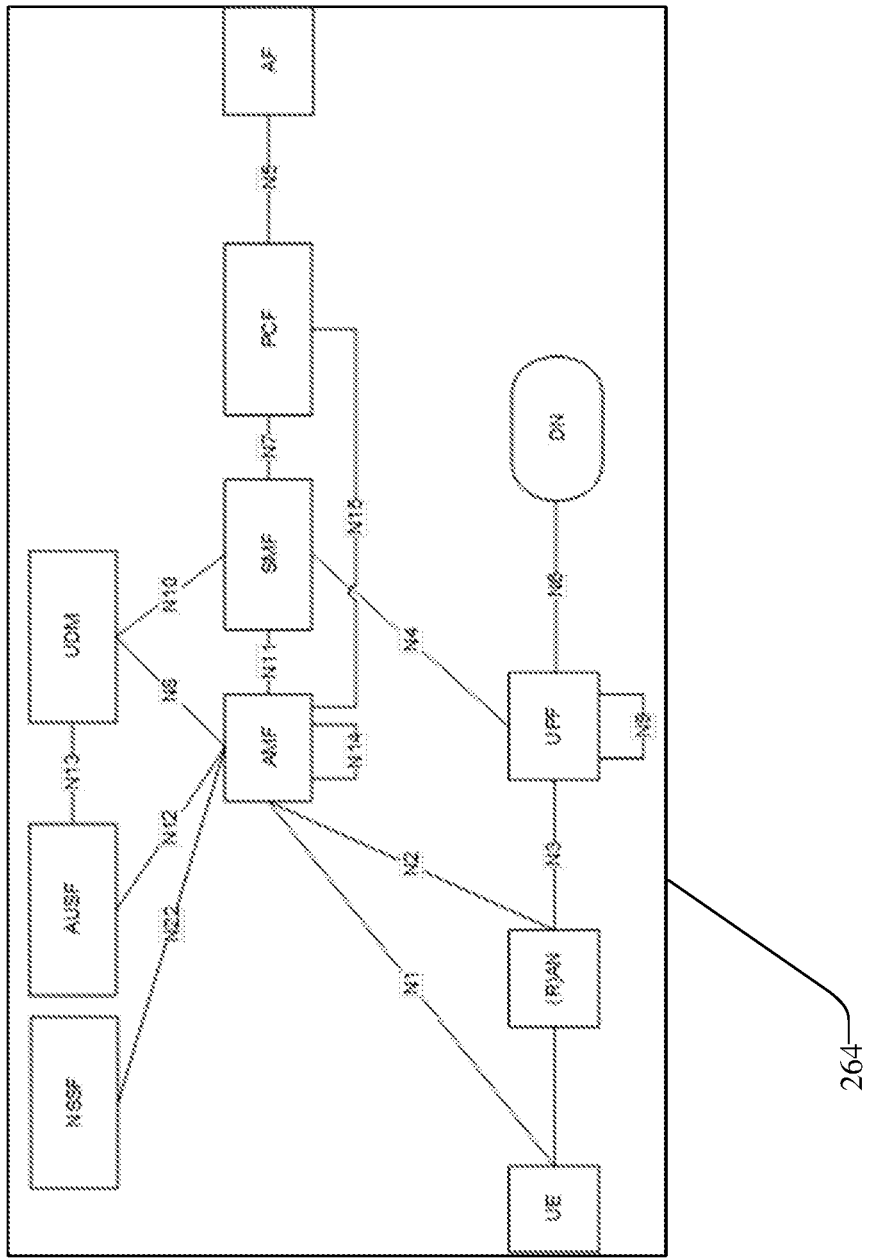
FIG. 2 depicts the 5GS non-roaming reference point representation of the reference architecture—showing how various network functions interact with each other.

Acronyms used in this disclosure are identified the first time that they are used. These acronyms are terms of art, often used in standards documents. Except where the terms are used in a clear and distinctly different sense than they are used in the art, we adopt the meanings found in wireless standards. For the reader's convenience, many of them are listed here:

5 GC 5G Core Network
5G-EIR 5G Equipment Identity Register
5GS 5G System
AF Application Function
AMF Access and Mobility Management Function
AUSF Authentication Server Function
DN Data Network
HO Hand Over
HPLMN Home Public Land Mobile Network
HR Home Routed (roaming)
LADN Local Area Data Network
Namf Service-based interface exhibited by AMF
NEF Network Exposure Function
NF Network Function
Nnrf Service-based interface exhibited by NRF
Npef Service-based interface exhibited by PCF
NRF Network Repository Function
NSSF Network Slice Section Function
NWDAF Network Data Analytics Function
OAM Operation, Administration, Management
PCF Policy Control Function
PDU Protocol Data Unit
PLMN Public Land Mobile Network
PRA Presence Reporting Area
(R)AN (Radio) Access Network
RA Registration Area
SCF Service Chaining Function
SCP Secured Copy Protocol
SMF Session Management Function
TA Tracking Area
UDM Unified Data Management
UDR Unified Data Repository
UDSF Unstructured Data Storage Function
UE User Equipment
UPF User Plane Function ETSI TS 123 501 describes the 5GS architecture, in the non-roaming case, relative to FIG. 4.2.3-1 reproduced as FIG. 1 and FIG. 4.2.3-2 reproduced as FIG. 2. The 5GS architecture depicts a system usable for detecting abnormal behavior of a user equipment (UE) mobile device or group of UE mobile devices. FIG. 1 shows a 5GS non-roaming service-based representation of reference architecture 164 where network functions within the control plane enable other authorized network functions to access their services. If a secured copy protocol (SCP) is deployed it can be used for indirect communication between NFs and NF services. SCP does not expose services itself. The 5G Session Management Function (SMF) and Access and Mobility Function (AMF) are fundamental elements of the 5G Service-Based Architecture (SBA). The SMF 156 is primarily responsible for interacting with the decoupled data plane, creating updating and removing Protocol Data Unit (PDU) sessions and managing session context with the User Plane Function (UPF) 166. The AMF 176 is primarily responsible for receiving all connection, authentication and session related information from the User Equipment (UE) and handling connection and mobility management tasks. The AMF may subscribe to mobility events as described in 502 sub-clause 5.2.2.3.1, where location change of cell id may be reported. The 5GS architecture allows NWDAF to collect data from a NF, such as AMF, SMF and AF. The NWDAF belongs to the same PLMN where the network function that notifies the data is located. The 5GS architecture allows NWDAF to retrieve the management data from OAM by invoking the existing OAM services, where OAM is a set of tools for operations, administration and management that have been used to provide network fault indication, performance information, fault localization, data and diagnosis functions.

FIG. 2 depicts the 5GS non-roaming reference point representation of reference architecture 264—showing how various network functions interact with each other. For simplicity, the NWDAF and its connections with other NFs, such as PCF or AMF, are not depicted in the point-to-point diagram. TS 23.288, listed earlier, includes further information on network data analytics architecture.

Multiple PDU session application of the 5GS architecture is described relative to ETSI TS 123 501 FIG. 4.2.3-3, not reproduced herein, which depicts applying non-roaming 5GS architecture for a multiple PDU session in reference point representation. FIG. 4.2.3-4, not reproduced herein, shows concurrent access to two data networks as a single PDU option. The described architecture allows the NWDAF to collect data from any NF and AF. The NWDAF belongs to the same PLMN where the NF that notifies the data is located.

TS 23.288 includes specification that the NWDAF is to provide UE mobility related analytics in the form of statistical observation, or mobility predictions, or both to another NF or AF. The analytic aspect can be related to mobility statistics and prediction or communication statistics and prediction as defined in 23.288.

The NWDAF is an analytic function with multiple analytic attributes. One of the objectives is to predict network, UE mobile device and group of UEs behaviors. A typical UE behavior is learned over time and any deviation from the norm is detected and reported by the NWDAF to any Network and/or Application Function(s) that successfully registered to receive analytic notification with analytic Id="Abnormal behavior" during a specified observation period. NWDAF based analytics related to abnormal behavior utilize data from the UE subscription, network configuration and or application layer request.

A stationary or highly mobile UE (or group of UEs) may be behaving in a degraded performance characteristic when it oscillates frequently between adjacent cells and or adjacent tracking areas (TA) and or adjacent registration areas (RA). For performance improvement, this condition needs to be detected relatively quickly, generate an alarm, if so programmed, and reported to a 5GC Network Function that can attempt to remedy the ping-ponging situation. The ping-ponging behavior can be detected by the AMF and reported to the NWDAF which can further analyze the time sequence for abnormality detection. In some implementations, any ping-ponging of a UE mobile device across registration areas and/or tracking area is considered abnormal behavior. A mobile and/or stationary UE may re-select between neighbor cells due to radio coverage fluctuations, which may lead to multiple re-registrations if the cells belong to different registration areas. The number of re-registrations N in a period M may be an indication for abnormal ping-pong behavior.

Figure 3:
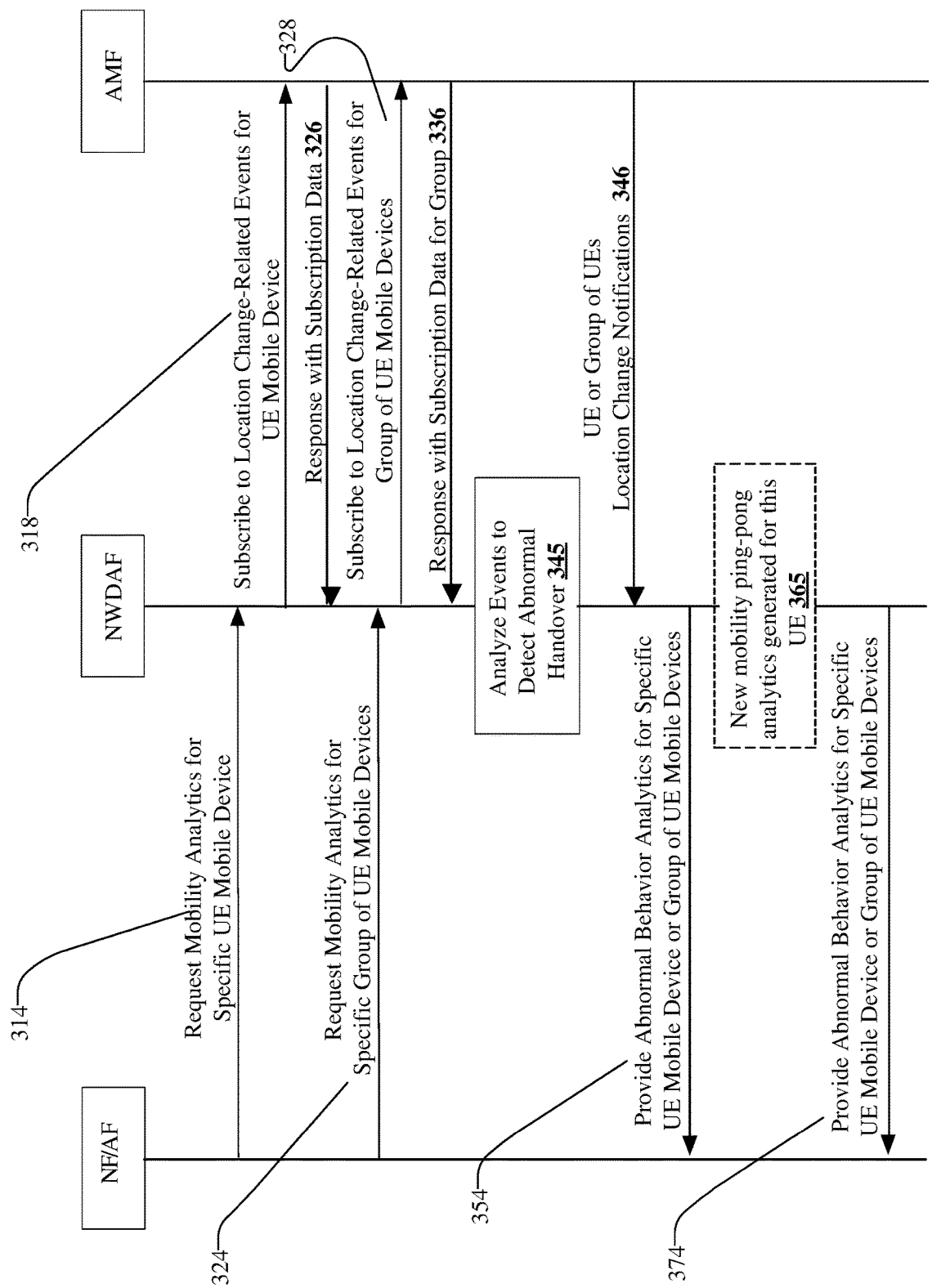
FIG. 3 shows an example message diagram of UE mobility analytics for the disclosed technology for detecting abnormal behavior of UE mobile devices.

FIG. 3 shows an example message diagram of UE mobility analytics for the disclosed technology. In the first step 314, the NF or AF sends a request to the NWDAF for mobility analytics on a specific UE 314 or a group of UEs 324, using service core network components of the cellular network. The NF or AF can request statistics or predictions or both. The network operator can configure the unacceptable ping-ponging frequency, and set the type of analytics to UE mobility information. The NF or AF provides the UE mobile device identifier or Internal Group ID which is the target for analytics. The NF and AF may subscribe to a single NWDAF report or continuous notification of UE mobility analytics. Once the request is authorized, if not already containing the required analytical information, the NWDAF may subscribe to events for a single UE mobile device 318 or for a group of UE mobile devices 328, with all the serving AMFs for a single or continuous notifications of location related-event changes. With the subscription information returned from the AMF to the NWDAF 326 for UE Mobile device or for a group of UE mobile devices 336, the NWDAF analyzes events to detect abnormal handover 345 and analyses the ping-ponging characteristics. The NWDAF provides requested abnormal behavior analytics for specific UE mobile device or group of UE mobile devices 354 to the NF or AF, to report the detected abnormal handover behavior with an identifier of the UE mobile device or group of devices ID. If, at the first step 314, the NF or AF has subscribed to receive continuous notifications for UE mobility analytics, the NWDAF when detecting abnormal behavior, per continuous mobility information updates provided by the AMF in step 346, will generate new mobility ping-pong analytics 365 and provide the abnormal behavior analytics for specific UE mobile device or group of UE mobile devices to the requesting NF or AF 374.

A ping-ponging effect can be determined by the NWDAF, or even possibly by the AMF, when handovers to the same pair of cells are happening N times within a time interval M, where N and M are configurable analytical parameters. For example, if N=4 and M=12 hours, the behavior of the mobile will be considered normal at 4 ping-pong handovers within 12 hours, whereas N=10 and M=0.5 hour is an example of a misbehaving UE, per operator specific settings. When the ping-ponging condition is triggered and the same pair of cells or neighboring cells traverse Tracking Areas (A and B) and or Registration Areas (C and D) and or Areas of Interest (E and F), the reported misbehavior shall include the cell pairs and the A and B TA pair and or the C and D Registration Area pair and or E and F Areas of Interest. If the pair of cells is contained within a TA and RA and Area of Interest, only the pair of cells will be reported when a UE or UEs are misbehaving.

A UE is a misbehaving one when it exhibits a ping-ponging effect across a set of neighboring cells, in which the minimum value for the set is two. Causes of this behavior can include malicious UE malware, or buggy or poorly configured device firmware. Misused or hijacked UE mobile devices are UEs in which malicious applications are running or UEs which have been stolen. In other cases, poor diversity balance in the UE downlink receivers, bad network planning of antenna tilts for adjacent cells, and/or bad weather with wind causing unplanned antenna tilts of adjacent cells can cause the ping-ponging effect detected as abnormal behavior. In another case, abnormal behavior is detected due to frequent blocking of a cell receiving path for reasons such as unplanned or malicious RF interference or a frequent movement of blocking elements such as tall vehicles. Frequent handovers to any cell are not typically an issue for the case in which UE devices are moving on a fast moving train, so are switching quickly from base station or cell A to another base station or cell B. Even in the case of a fast moving train, too-frequent handovers may be configured to be reported to the network operator. In one implementation, a base station includes three cells, which each covers a sector of 120 degrees in space. In another implementation, a base station includes six cells, each of which covers a sector of 60 degrees in space. In another implementation, a base station includes six cells where three cells cover a sector of 120 degrees in space and frequency of operation F1 and the other three cells also cover sector of 120 degrees in space but frequency of operation F2. In another implementation, a base station includes 12 cells where six cells cover a sector of 60 degrees in space and frequency of operation F1 and the other six cells also cover sector of 60 degrees in space but frequency of operation F2.

User experience of ping ponging device(s) can be an unacceptable performance and/or high battery usage. Network experience of ping ponging device(s) can be a high signaling load causing cell/network congestion and denial of service or connectivity to other users. The ping-ponging impact on registration area and or tracking area and or areas of interest is a secondary one when the pair of cells traverses multiple registration and or tracking areas and or areas of interest.

Ping-ponging devices can be detected using a service that enables a NF to subscribe and get notified about events that include location changes for a specific cell identified by Cell ID or tracking area as identified by tracking area identifier (TAI) or registration area. The tracking area changes are analyzed by reviewing the TAIs. When the UE mobile device has been identified, the NWDAF can look up the background information about the UE. When UE has been identified in the request to the AMF, the AMF reports back the locations change information and may also report the abnormality of the requested device. For detecting abnormal behavior, location information can include time stamp information and cell IDs, and can consider UE mobile devices moving in or out of a subscribed "Area of Interest" as described in clause 5.6.11 of TS 23.501. Other events that can be reported and analyzed for detecting abnormal behavior of user equipment include registration state changes—as registered or deregistered. In one example, the abnormal behavior is the act of frequently ping-ponging or crossing at least two registration areas.

AMF can report UE presence in an Area of Interest, reporting usage via "UE mobility event notification" service, as described in ETSI TS 123 501 clause 5.3.4.4. Upon reception of a mobility event notification from AMF, the SMF determines how to deal with the PDU Session, e.g. reallocate the UPF. When a PDU Session is established or modified, or when the user plane path has been changed, such as UPF re-allocation/addition/removal, SMF may indicate UE presence in an Area of Interest, for example based on UPF's Service Area or subscription by PCF for reporting UE presence in pre-defined Presence Reporting Area (PRA). For 3GPP access, the Area of Interest constitutes a list of Tracking Areas and/or cell identifiers and/or NG-RAN node identifiers and/or Presence Reporting Area ID(s) and optionally the elements for one or more of the Presence Reporting Areas, i.e. TAs and/or NG-RAN nodes and/or cells identifiers and/or LADN DNN. When a UE is ping-ponging across pairs of PRAs, SMF and PCF will be frequently notified by the AMF about the PRA changes. This can lead to undesirable frequent changes of the user plane and policy rules updates. To prevent such undesirable frequent user plane change and or policy rules update, the AMF, SMF, PCF can register to receive abnormal ping-pong behavior indication from the NWDAF and consider the abnormal behavior when deciding to execute a user plane change and/or to update policy rules.

Computer System

FIG. 4 is a simplified block diagram of an embodiment of a system 400 that can be used for detecting abnormal behavior of a user equipment (UE) mobile device or a group of UE mobile devices.

Computer system 410 typically includes a processor subsystem 472 which communicates with a number of peripheral devices via bus subsystem 450. These peripheral devices may include a storage subsystem 426, comprising a memory subsystem 422 and a file storage subsystem 436, user interface input devices 438, user interface output devices 478, and a network interface subsystem 476. The input and output devices allow user interaction with computer system 410 and network and channel emulators. Network interface subsystem 474 provides an interface to outside networks and devices of the system 400. The computer system further includes communication network 484 that can be used to communicate with user equipment (UE) units; for example, as a device under test.

The physical hardware component of network interfaces are sometimes referred to as network interface cards (NICs), although they need not be in the form of cards: for instance they could be in the form of integrated circuits (ICs) and connectors fitted directly onto a motherboard, or in the form of microcells fabricated on a single integrated circuit chip with other components of the computer system.

The NWDAF system is operating in a closed loop automated fashion using RESTful APIs for collecting input information from NFs, AFs and OAM and providing analytic outputs, through RESTful API, to the requesting consumers. Similar to other 5GC NFs, the NWDAF can be instantiated by a cloud orchestrator in many implementations, Alternatively, an administrator can utilize input devices for the administration of NWDAF system, with the option of applying API-based inputs and outputs.

User interface input devices 438 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 410.

User interface output devices 478 may include a display subsystem, a printer, a fax machine, or non-visual displays such as audio output devices. The display subsystem may include a cathode ray tube (CRT), a flat panel device such as a liquid crystal display (LCD) or LED device, a projection device, or some other mechanism for creating a visible image. The display subsystem may also provide non visual display such as via audio output devices. In general, use of the term "output device" is intended to include all possible types of devices and ways to output information from computer system 410 to the user or to another machine or computer system. The computer system further can include user interface output devices 478 for communication with user equipment.

Storage subsystem 426 stores the basic programming and data constructs that provide the functionality of certain embodiments of the present invention. For example, the various modules implementing the functionality of certain embodiments of the invention may be stored in a storage subsystem 426. These software modules are generally executed by processor subsystem 472.

Storage subsystem 426 typically includes a number of memories including a main random access memory (RAM) 434 for storage of instructions and data during program execution and a read only memory (ROM) 432 in which fixed instructions are stored. File storage subsystem 436 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 436. The host memory storage subsystem 426 contains, among other things, computer instructions which, when executed by the processor subsystem 472, cause the computer system to operate or perform functions as described herein. As used herein, processes and software that are said to run in or on "the host" or "the computer", execute on the processor subsystem 472 in response to computer instructions and data in the host memory storage subsystem 426 including any other local or remote storage for such instructions and data.

Bus subsystem 450 provides a mechanism for letting the various components and subsystems of computer system 410 communicate with each other as intended. Although bus subsystem 450 is shown schematically as a single bus, alternative embodiments of the bus subsystem may use multiple busses.

Computer system 410 itself can be of varying types including a personal computer, a portable computer, a workstation, a computer terminal, a network computer, a television, a mainframe, or any other data processing system or user device. Due to the ever changing nature of computers and networks, the description of computer system 410 depicted in FIG. 4 is intended only as a specific example for purposes of illustrating embodiments of the present invention. Many other configurations of computer system 410 are possible having more or less components than the computer system depicted in FIG. 4.

Some Particular Implementations

Some particular implementations and features are described in the following paragraphs.

In one implementation, the disclosed technology includes a method of detecting abnormal behavior of a user equipment (UE) mobile device, including a network data analytics function (NWDAF) component, in communication with core network components of a cellular network, subscribing to location change-related events that report at least a change event for a UE mobile device connection to and/or drop or handover from a cell. The method also includes analyzing the location change-related events to detect abnormal handover (HO) behavior when the UE mobile device changes its selection of a base station or cells more than N times in not more than M minutes, such as 10 times in not more than 5 minutes. The disclosed method further includes reporting the detected abnormal HO behavior with an identifier of the UE mobile device involved. In some implementations, the reporting includes the involved cell's ID.

This system and other implementations of the technology disclosed can include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with sets of base features identified as implementations.

In some implementations of the disclosed technology, the UE mobile device is analyzed in a test environment and signals from at least two base stations or cells are supplied to the UE mobile device by a channel emulator in the test environment. In other implementations, the UE mobile device is analyzed in a live network environment and the UE mobile device belongs to a customer of an operator of the live network.

Some implementations of the disclosed technology are further applied to a group of UE mobile devices selected for analysis, where the group is based on the device type, geography, or any custom-defined affinity. An affinity is a common attribute of interest such as a specific enterprise, a mobile application, or a software version. A user or network operator can select other groupings of UE for analysis. One disclosed implementation further includes assigning UE mobile devices in the group to classes and reporting analytics on group behavior for the classes.

For some implementations of the disclosed technology, the change in selection criteria is based on changes in selection among a set of two or more base stations or cells, each of which is selected at least twice by the UE mobile device in the M minutes. In some implementations, the change in selection criteria is based on changes in selection among a set of two or more base stations or cells, each of which is selected at least twice by the UE mobile device in the group in the M minutes.

One implementation of the disclosed technology includes the NWDAF subscribing to location change-related events within a tracking area. Some implementations further include the NWDAF subscribing to location change-related events within an area of interest. Some implementations further include the NWDAF subscribing to location change-related events across tracking areas (TA). Other implementations of the disclose technology further include the NWDAF subscribing to location change-related events across areas of interest.

In some implementations of the disclosed technology, the set of two or more base stations or cells are within the same registration area.

For some implementations of the disclosed technology, the reporting of the detected abnormal HO behavior happens periodically in batches. For other implementations of the disclosed technology, the reporting of the detected abnormal HO behavior happens in near real time. The solution is enhanced by real time reporting. In some use cases, a post mortem analysis is beneficial for the operator for determining ongoing improvements for the network.

Some implementations of the disclosed technology further include assigning the UE mobile device to a class based on its rate of motion and analyzing collective behavior of UEs belonging to the class. Other implementations further include assigning the UE mobile device to a class based on the device being stationary and analyzing collective behavior of UEs belonging to the class. One implementation further includes configuring the UE mobile device as a stationary device, and assigning the UE mobile device to a class based on the device being stationary and analyzing collective behavior of UEs belonging to the class.

In some implementations, the UE sources include individual UE devices in individual RF isolation boxes. In other implementations, the UE sources include a UE source device simulator that emulates the multiple UE devices.

Other implementations include tangible non-transitory computer readable storage media loaded with program instructions executed on processors to implement a method as described above. A tangible non-transitory computer readable medium does not include a transitory wave form.

Yet other implementations may include a system for detecting abnormal behavior of a user equipment (UE) mobile device or group of UE mobile devices, the system including processors, memory coupled to the processors and computer instructions from the non-transitory computer readable storage media loaded into the memory, according to the preceding computer readable media, described above.

We claim as follows:

1. A method of detecting abnormal ping-ponging behavior of a user equipment (UE) mobile device, including:
   a network data analytics function (NWDAF) component, in communication with core network components of a cellular network, subscribing to location change-related events from the core network components that report at least a change event for a UE mobile device connection to or drop or handover from a cell;
   analyzing the location change-related events to detect abnormal ping-ponging handover (HO) behavior when the UE mobile device updates its selection of a base station or cell more than N times in a period of M minutes, wherein N and M are configurable analytical parameters; and
   reporting the detected abnormal HO behavior with an identifier of the UE mobile device involved.

2. The method of claim 1, wherein the UE mobile device is analyzed in a test environment and signals from at least two base stations or cells are supplied to the UE mobile device by a channel emulator in the test environment.

3. The method of claim 1, wherein the UE mobile device is analyzed in a live network environment and the UE mobile device belongs to a customer of an operator of the live network.

4. The method of claim 1, further applied to a group of UE mobile devices selected for analysis, that is one of device based, geographically based or custom-defined affinity based selected by a user or network operator.

5. The method of claim 4, further including assigning UE mobile devices in the group to classes and reporting analytics on group behavior for the classes.

6. The method of claim 4, wherein the change in selection criteria is based on changes in selection among a set of two or more base stations or cells, each of which is selected at least twice by the UE mobile device in the group in the M minutes.

7. The method of claim 1, further including the NWDAF subscribing to location change-related events within a tracking area.

8. The method of claim 1, wherein the change in selection criteria is based on changes in selection among a set of two or more base stations or cells, each of which is selected at least twice by the UE mobile device in the M minutes.

9. The method of claim 8, wherein the set of two or more base stations or cells are within the same registration area.

10. The method of claim 1, further including the NWDAF subscribing to location change-related events within an area of interest.

11. The method of claim 1, further including the NWDAF subscribing to location change-related events across tracking areas (TA) or areas of interest or registration areas (RAs).

12. The method of claim 1, wherein the reporting of the detected abnormal HO behavior happens periodically in batches.

13. The method of claim 1, wherein the reporting of the detected abnormal HO behavior happens in near real time.

14. The method of claim 1, further including assigning the UE mobile device to a class based on its rate of motion and analyzing collective behavior of UEs belonging to the class.

15. The method of claim 1, further including configuring the UE mobile device as a stationary device, and assigning the UE mobile device to a class based on the device being stationary and analyzing collective behavior of UEs belonging to the class.

16. A tangible non-transitory computer readable storage media, loaded with program instructions that, when executed on processors, cause the processors to implement method of detecting abnormal behavior of a user equipment (UE) mobile device, including:
   a network data analytics function (NWDAF) component, in communication with core network components of a cellular network, subscribing to location change-related events from the core network components that report at least a change event for a UE mobile device connection to or drop or handover from a cell;
   analyzing the location change-related events to detect abnormal ping-ponging handover (HO) behavior when the UE mobile device updates its selection of a base station or cell more than N times in a period of M minutes, wherein N and M are configurable analytical parameters; and
   reporting the detected abnormal HO behavior with an identifier of the UE mobile device involved and the involved cell's ID.

17. The tangible non-transitory computer readable storage media of claim 16, further applied to a group of UE mobile devices selected for analysis, that can be device based, geographically based or custom-defined affinity based, selected by a user or network operator.

18. The tangible non-transitory computer readable storage media of claim 17, wherein the change in selection criteria is based on changes in selection among a set of two or more base stations, each of which is selected at least twice by the UE mobile device, in the group, in the M minutes.

19. The tangible non-transitory computer readable storage media of claim 16, wherein the change in selection criteria is based on changes in selection among a set of two or more base stations or cells, each of which is selected at least twice by the UE mobile device in the M minutes.

20. The tangible non-transitory computer readable storage media of claim 19, wherein the set of two or more base stations or cells are within the same registration area.

21. The tangible non-transitory computer readable storage media of claim 16, further including the NWDAF subscribing to location change-related events within a tracking area.

22. The tangible non-transitory computer readable storage media of claim 16, further including the NWDAF subscribing to location change-related events within an area of interest.

23. The tangible non-transitory computer readable storage media of claim 16, wherein the reporting of the detected abnormal HO behavior happens periodically in batches.

24. The tangible non-transitory computer readable storage media of claim 16, further including the NWDAF subscribing to location change-related events across tracking areas (TA) or areas of interest or registration areas (RAs).

25. A system for detecting abnormal behavior of a user equipment (UE) mobile device, the system including a processor, memory coupled to the processor and computer instructions from the non-transitory computer readable storage media of claim 16 loaded into the memory.

* * * * *